United States Patent
Döling et al.

(10) Patent No.: US 7,163,566 B2
(45) Date of Patent: Jan. 16, 2007

(54) METHOD OF OPERATING A GAS GENERATING SYSTEM AND A GAS GENERATING SYSTEM

(75) Inventors: Fabian Döling, Neuhausen a.d.F (DE); Martina Fischer, Weil der Stadt/Hausen (DE); Uwe Griesmeier, Markdorf (DE); Jochen Nussbaumer, Salach (DE)

(73) Assignee: NuCellSys GmbH, Kirchheim/Teck-Nabern (DE)

( * ) Notice: Subject to any disclaimer, the term of this patent is extended or adjusted under 35 U.S.C. 154(b) by 284 days.

(21) Appl. No.: 09/985,644

(22) Filed: Nov. 5, 2001

(65) Prior Publication Data

US 2002/0056229 A1 May 16, 2002

(30) Foreign Application Priority Data

Nov. 4, 2000 (DE) ................................ 100 54 846

(51) Int. Cl.
*C01B 3/36* (2006.01)
(52) U.S. Cl. .................................. 48/197 R; 48/127.7
(58) Field of Classification Search .................... 48/61, 48/197 R, 198.1; 422/111
See application file for complete search history.

(56) References Cited

U.S. PATENT DOCUMENTS

| | | | |
|---|---|---|---|
| 4,400,180 A | 8/1983 | Marion et al. ................. 48/197 |
| 4,479,810 A | 10/1984 | Marion et al. | |
| 4,490,156 A | 12/1984 | Marion et al. ................. 48/61 |
| 6,051,192 A | 4/2000 | Maston et al. ............... 422/110 |
| 6,165,633 A * | 12/2000 | Negishi ........................ 429/17 |
| 6,630,109 B1 * | 10/2003 | Yamaoka et al. ............ 422/111 |

FOREIGN PATENT DOCUMENTS

| | | |
|---|---|---|
| DE | 24 52 147 | 11/1974 |
| DE | 198 47 211 | 10/1998 |
| DE | 198 25 772 | 1/1999 |
| DE | 199 18 997 | 4/1999 |
| EP | 978 476 | 2/2000 |
| EP | 1 014 464 | 6/2000 |
| JP | 06349510 | 12/1994 |
| WO | WO 01/16022 | 3/2001 |

OTHER PUBLICATIONS

EPO Search Report dated Mar. 12, 2002 with English blank.

* cited by examiner

*Primary Examiner*—Glenn Caldarola
*Assistant Examiner*—Tom P. Duong
(74) *Attorney, Agent, or Firm*—Crowell & Moring LLP

(57) ABSTRACT

A method of operating a gas generating system for generating a hydrogen-rich product gas by partial oxidation or autothermal reforming includes operating a reactor approximately adiabatically. The ratio of the mole flow $O_2$/mole flow C-atoms$_{fuel}$ ($O_2$/C ratio) is controlled on the basis of the temperature of the educts and of the reaction temperature. For adjusting and maintaining an optimal $O_2$/C ratio with respect to a high hydrogen yield, approximately an $O_2$/C ratio corresponding of the present educt temperatures is adjusted and is corrected on the basis of the deviation of the reaction temperature from a desired reaction temperature. The $O_2$/C ratio is then adjusted by controlling the oxygen-containing educt or the hydrocarbon-containing educt.

13 Claims, 1 Drawing Sheet

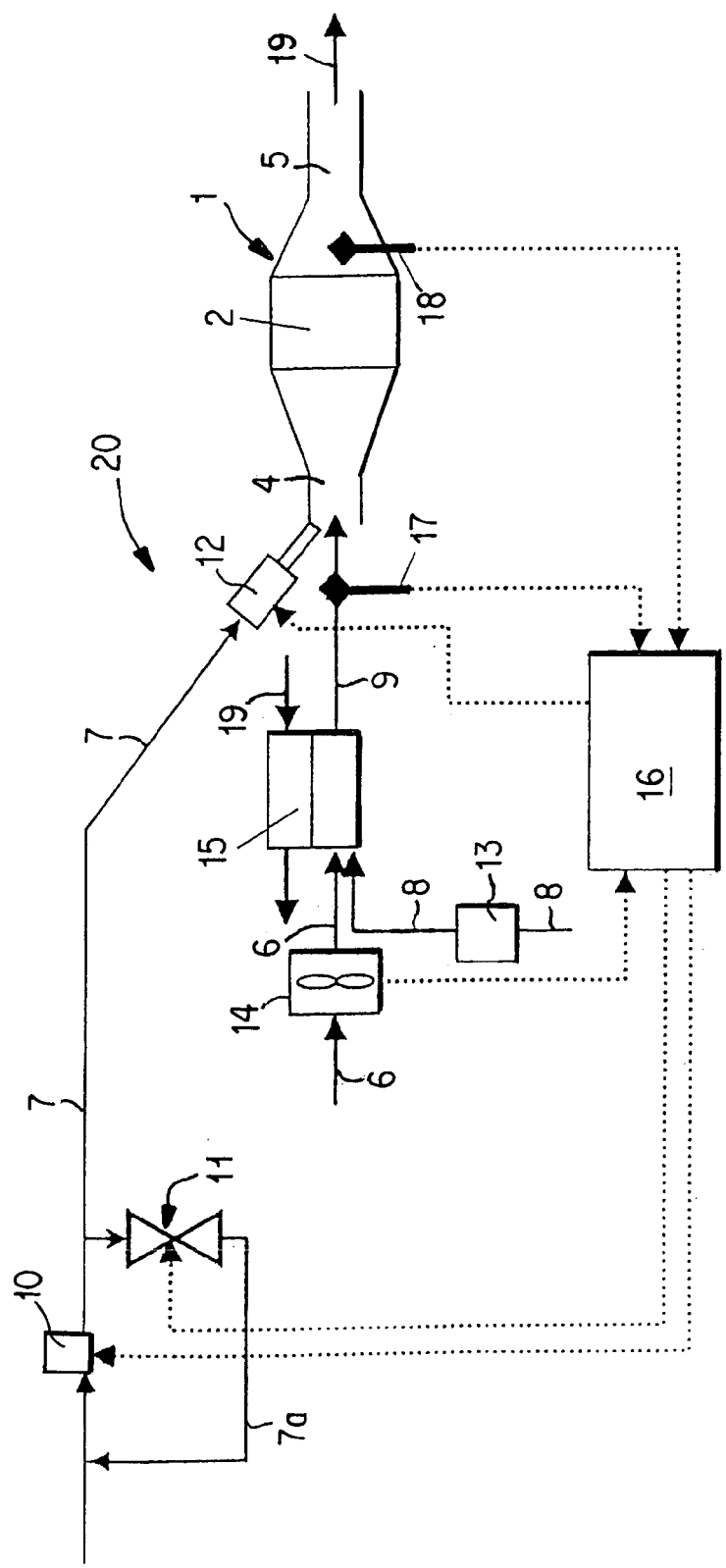

METHOD OF OPERATING A GAS GENERATING SYSTEM AND A GAS GENERATING SYSTEM

This application claims the priority of German Patent Document No. 100 54 846.6, filed on Nov. 4, 2000, the disclosure of which is expressly incorporated by reference herein.

BACKGROUND AND SUMMARY OF INVENTION

The present invention relates to a method of operating a gas generating system as well as to a gas generating system. In particular, the present invention relates to a method of operating a gas generating system in which a high hydrogen yield is achieved by controlling the mass flow rate of individual educts.

Because of their high efficiency, fuel cells are increasingly used for generating electric energy for stationary as well as for mobile applications. In this case, fuel cells are normally operated by hydrogen. However, the storage of hydrogen is difficult and requires high technical expenditures. For this reason, hydrogen is stored in the form of fuels, such as hydrocarbons and alcohols and, corresponding to the requirement of the fuel cell, and is obtained by a gas generating system. In the gas generating system, the fuel is converted with the addition of air and/or water to a hydrogen-rich gas.

Chemical processes for generating hydrogen from hydrocarbons or alcohols are partial oxidation, vapor reforming, and autothermal reforming. Partial oxidation is an exothermal reaction in which the fuel substoichiometrically reacts with oxygen. As a rule, atmospheric oxygen is used for this purpose. During endothermal vapor reforming, the fuel reacts with water while heat is supplied. Autothermal reforming is a combination of partial oxidation and vapor reforming. In this case, the reaction heat of the partial oxidation is provided for the vapor reforming. However, the reaction is not necessarily carried out autothermally.

German Published Patent Application 24 52 147 discloses an automatic control system for a gas generator in which high-grade working gases are generated from hydrazine in a catalytic exothermal reaction. Since, in the case of many catalyst materials, the efficiency is increased as the temperature rises, a cooling of the catalyst temperature is to be avoided which is caused by an excessive amount of fed cold liquid fuel. For this purpose, a flow control valve is provided in the inflow of the liquid fuel and is controlled by a temperature-dependent control element, specifically a bimetallic strip. The flow control valve is opened up as the temperature rises and closes again when the temperature falls because of an excessive cooling by the liquid fuel.

U.S. Pat. No. 4,400,180 discloses a process for partial oxidation and a control system for a continuous generating of a synthesis gas from a fuel. In this case, the fuel may be replaced during the process by another fuel without the requirement of reducing the system or lowering the pressure in the gas generator. For this purpose, a non-catalytic burner is provided for the partial oxidation with central guiding devices, which are spaced radially from concentric coaxial outer guiding devices. Coaxially ring-shaped passages extend between the two guiding devices. The known control system permits a change-over between different fuel currents which flow either through the central guiding devices or the ring-shaped passages, and an adjustment of the flow rates of the reactant flow of the free-oxygen-containing gas. Water is used as a temperature moderator and, if required, is guided into the reaction zone in order to adjust the atomic ratio of free oxygen/carbon and the weight ratio of water/fuel in the reaction zone according to the conditions for autothermal reforming.

Manual or automatic control devices are provided for switching and controlling the fuel, oxygen, and vapor flows. By these devices, a change-over takes place between basic fuel and spare fuel. The flow of the gas containing free oxygen and the temperature moderator are controlled to maintain an efficient and stable gas emission. For this purpose, the flow rates of the four currents (specifically vapor, basic fuel, spare fuel, and gas containing free oxygen) are determined by individual sensors. The actual flow rates are compared with desired flow rates, and the flow rates are adjusted correspondingly. By controlling the flow rates corresponding to the desired flow rates, the temperature in the burner is kept constant within a temperature range of ±200° C.

U.S. Pat. No. 4,490,156 discloses a control system for a continuous generating of synthesis gas by partial oxidation, in which a fuel can be replaced by another fuel during the process without the requirement of reducing the gas generator or lowering the pressure. A non-catalytic burner, which has two sections and a rapid transition characteristic, is used for implementing the partial oxidation of the fuels. The control system provides for switching the fuel currents which flow in one or both sections of the burner. The flow rates of the oxygen, of the fuel, and of the temperature moderator can be changed in one or both sections of the burner to cause a fast transition of the burner. Separate flow rate sensors and separate flow rate control devices are provided in each feed line for an independent monitoring and adjusting of the flow rates of the individual reaction partners. The temperature and the weight ratio of water/fuel in the reaction zone is controlled by controlling the flow rates of the reactant flow of the gas containing free oxygen with or without a temperature moderator and optionally while adding additional water.

The control systems known from the prior art either have a simple design and a very limited control capacity or have a complicated and high-expenditure construction for permitting a variable control because separate sensor and control devices for controlling the flow rates are provided for each of the reaction partners.

In contrast, it is an object of the present invention to provide a method of operating a gas generating system as well as a gas generating system, in which a high hydrogen yield is ensured by controlling the educt flows by cost-effective and constructively simple control and monitoring expenditures, particularly by a limitation of the number of control and monitoring devices.

Accordingly, a reactor of a gas generating system is operated at least approximately adiabatically. For adjusting and maintaining a desired ratio of the mole flow $O_{2\ oxygen}$/mole flow C-atoms$_{fuel}$ (i.e., $O_2/C$ ratio) of the educts, (1) the temperature of the educts is determined before they are charged into the reactor;

(2) an $O_2/C$ ratio for the determined educt temperatures $(O_2/C_{educt\ temp.})$ at which theoretically a conversion of the educts takes place at a desired reaction temperature is determined by comparative values;

(3) the $O_2/C$ ratio according to the educt temperatures $(O_2/C_{educt\ temp.})$ is adjusted (a) by controlling the mass flow rate of the oxygen-containing educt for a known defined mass flow rate of the hydrocarbon-containing educt and optionally water or (b) by controlling the mass flow rate of the hydrocarbon-containing educt for a known defined mass flow rate of the oxygen-containing educt and optionally water;

(4) a momentary reaction temperature of the reactor is determined;

(5) a correction value $\Delta O_2/C$ for the $O_2/C$ ratio is determined by comparative values from the temperature difference between the actual reaction temperature and the desired reaction temperature;

(6) the $O_2/C$ ratio according to $O_2/C_{educt\ temp}$ and $\Delta O_2/C$ is changed (a) by controlling the mass flow rate of the oxygen-containing educt in the case of a known defined mass flow rate of the hydrocarbon-containing educt and optionally water or (b) by controlling the mass flow rate of the hydrocarbon-containing educt in the case of a known defined mass flow rate of the oxygen-containing educt and optionally water.

During partial oxidation as well as during autothermal reforming, the hydrogen yield is influenced by (1) the preheating temperature of the educts at the reactor inlet, (2) the ratio of the mole flow rate $O_2$/mole flow rate C-atoms$_{fuel}$, for example, the ratio of the supplied air quantity to the fuel quantity, and (3) in the case of a combination of partial oxidation and water vapor reforming, i.e., autothermal reforming, additionally by the supplied water quantity. In this case, the hydrogen yield is highly dependent on the $O_2/C$ ratio. Even small deviations from an optimal ratio cause losses in the yield. In an adiabatically-operated reactor, changes in the $O_2/C$ ratio cause a considerable change of the reaction temperature. A conclusion can therefore be drawn with respect to the $O_2/C$ ratio in the reactor on the basis of the reaction temperature.

According to the present invention, by measuring the educt temperatures and the momentary reaction temperature, the $O_2/C$ ratio present in the reactor or the deviation from a desired $O_2/C$ ratio is determined for an optimal hydrogen yield. The desired $O_2/C$ ratio is adjusted by controlling the mass flow rate of an educt, which in the following will also be called a controlled educt, with a defined known mass flow rate of the other educts. The known mass flow rates may be (adjustably) fixed, for example, by corresponding flow control devices, valves or also the rotational speed of a compressor. By the determined educt temperatures, the desired $O_2/C$ ratio at which an optimal hydrogen yield is achieved, is set in a (first) rough approximation. This takes place on the basis of comparative values which contain the flow amounts of the controlled educt or the control value for the controlled educt at different educt temperatures.

A correction of the approximate adjustment or a regulating/controlling of the desired $O_2/C$ ratio is carried out by the deviation of the actual reaction temperature from the desired reaction temperature as well as by additional comparative values which contain the flow amounts or the changes of the flow amounts of the controlled educt at different reaction temperature deviations. The correction until the desired $O_2/C$ ratio has been reached or the setting of the desired $O_2/C$ ratio, which depends on (1) the deviation of the reaction temperature, (2) the desired precision of the $O_2/C$ ratio, and (3) the quality of the comparative values, may require one or several correcting steps. The desired $O_2/C$ ratio is therefore adjusted or maintained by a fundamental/basic setting of an $O_2/C$ ratio according to the educt temperatures and a precise adjustment according to the reaction temperature.

The measuring of the educt temperatures and of the reaction temperature can take place simultaneously or successively in a timed or continuous manner. The adjusting of the mass flow rate of the controlled educt can also take place by a superposition of the adjustment according to the educt temperatures as well as the adjustment according to the actual reaction temperature (that is, in the manner of two control/automatic control circuits, for example, in the form of two controllers for the controlled educt). However, it is also possible to process the determined temperatures to obtain a control value, for example, by calibrating or weighting the determined temperatures or the temperature deviation and provide them as an input quantity for a single controller.

The comparative values are determined by simulation computations or experimentally and may be filed as a function, a characteristic curve, or a truth table. The comparative values can be stored, for example, in computer devices/memories or can be implemented implicitly in the form of a PID controller (proportional integral differential controller).

In an advantageous manner, the controlling and checking of the $O_2/C$ ratio and thus of the flow amount of the controlled educt is based on the determination of the reaction temperature and the educt temperatures. The determination of temperatures is constructively simpler than high-expenditure flow quantity determinations. An explicit measuring of the flow amounts is not necessary in this case. Control devices are required only for the educt to be controlled, either for the hydrocarbon-containing educt or the oxygen-containing educt. The method according to the present invention is particularly suitable for a static system, in which the amount of the hydrogen to be generated should essentially remain the same. This hydrogen quantity is defined by a corresponding selection of the mass flow rate of the known indicated educt.

For a gas generating system according to the present invention, the reactor is thermally insulated with respect to the environment to permit an approximately adiabatic operation. Devices are provided for measuring a momentary reaction temperature and for measuring the temperature of the educts. Computer devices are provided for analyzing the measured values and computing control values for the devices for controlling the mass flow rate of at least one educt.

An adiabatic reactor can be implemented without major expenditures by a thermal insulation with the suitable materials. The monitoring of educt flows takes place indirectly by temperatures sensors. Temperature sensors are not only cost-effective, but also are reliable in their operation and easy to handle.

In a further development of the method according to the present invention, a correction value $\Delta O_2/C$ will then be determined. A corrected $O_2/C$ ratio will be adjusted when the temperature difference is larger than a defined value. By way of the amount of the defined value, the adjusting precision of the desired $O_2/C$ ratio can be determined.

In an advantageous further development of the method according to the present invention, in the case of the adjusting of the $O_2/C$ ratio, the mass flow rate of the hydrocarbon-containing educt is monitored by controlling the mass flow rate of the oxygen-containing educt, or the mass flow rate of the oxygen-containing educt is monitored by controlling the mass flow rate of the hydrocarbon-containing educt. For a change of the mass flow rate of the monitored educt, the $O_2/C$ ratio is maintained by the follow-up of the mass flow rate of the controlled educt. The monitoring or determination of the mass flow rate of the educt which is not controlled in each case (a monitored educt) permits a greater flexibility during the adjustment of the $O_2/C$ ratio. In particular, the hydrogen quantity to be generated per time unit can be adjusted in a controlled manner while maintaining the desired optimal $O_2/C$ ratio by changing the mass flow rate of the monitored educt. Thus, the method according to the present invention is specifically suitable for dynamic systems.

Although changes in the mass flow rate of the monitored educt can be determined and compensated by changes of the reaction temperature, this automatic control or control reacts relatively sluggishly to rapid changes. Particularly when controlling the $O_2/C$ ratio by the mass flow rate of the hydrocarbon-containing educt (of the fuel), load jumps when generating the hydrogen-containing synthesis gas result in an abrupt change of the mass flow rate of the oxygen-containing educt (normally of the supplied air mass). In the case of a load jump to a higher performance (increase of the air mass flow rate), a deviation of the $O_2/C$ ratio is caused in the direction toward higher temperatures. Because partial oxidation and autothermal reforming take place at very high temperatures, this may lead to a high thermal stressing of the components which may result in a possible failure. Because of the readjusting of the fuel mass flow rate at a point in time at which no great temperature change has yet occurred in the reactor, high temperature peaks are prevented, as may occur in the case of a pure temperature control. Particularly the controlling of the fuel quantity by a superimposing of the two control mechanisms permits a secure and optimal (dynamic) operation of the gas generating system.

In the case of an embodiment according to the present invention, the ratio of water to hydrocarbon-containing educt (S/C-ratio) during a change of the mass flow rate of the hydrocarbon-containing educts is maintained by the follow-up of the mass flow rate of the water. It was found that the ratio of water to the hydrocarbon-containing educt affects the hydrogen yield, although to a lesser extent than the $O_2/C$ ratio. Although a larger amount of water results in a greater hydrogen yield, the more water is metered, the more energy is required for the vaporization and overheating. Since no arbitrarily large amount of energy is available in the system, the preheating temperature of the educts will fall as the water metering rises. When the feeding of water is too large, the hydrogen yield is reduced because the educt preheating temperature is too low. An S/C ratio value of 1.5 was found to be advantageous. Thus, when the fuel mass flow rate is changed, the water quantity is correspondingly readjusted.

In a preferred embodiment of the method according to the present invention, PID controllers are used for controlling the mass flow rates of the educts. The educt temperatures, the reaction temperature, and optionally values for the mass flow rate of the monitored educt, and in the case of a PID controller for controlling the water quantity, values for the mass flow rate of the hydrocarbon-containing educt, are used as input quantities for the PID controllers. By the PID controllers, the educt mass flow rates can be controlled or automatically controlled in a simple manner. The comparative values in the PID controllers are implicitly implemented in the form of the proportionality between the input quantity and the control variable. Optionally, the measured values for the mass flow rates, the temperature, etc. can first be processed in computer devices before they are fed to the PID controller as input quantities.

In a further embodiment according to the present invention, only the temperature of the educts is determined whose temperature influence on the reaction temperature should not be neglected with respect to the desired adjusting precision of the $O_2/C$ ratio. Partial oxidation or autothermal reforming takes place at high temperatures. In this case, the reaction temperature, depending on the initial temperature of the educts, is influenced by these to a varying degree. Normally, the oxygen-containing educt component is preheated, while the fuel is fed to the reactor without preheating. When the temperature difference is correspondingly large, the influence of the fuel temperature on the reaction temperature will be negligible. As a result of the expedient limitation, the constructive and measuring-related expenditures can be further reduced.

In another embodiment of the present invention, a plurality of educts are mixed with one another before they are charged into the reactor and the temperature of this educt mixture is determined. As a result, the constructive and procedural measuring expenditures can be further reduced. For example, in the case of the autothermal reforming, the combining of the oxygen-containing component, preferably of the supplied air, with water is expedient so that only the temperature of the water vapor/air mixture is determined.

In another embodiment of the present invention, liquid fuel is used as a carbon-containing educt, and the setting of the desired $O_2/C$ ratio takes place by regulating the mass flow rate of the liquid fuel. The metering of liquids can basically be carried out in a simpler and significantly faster manner than that of gases so that a faster reaction time of the system can be implemented while the construction of the control devices is simultaneously simpler. The result is that optionally the mass flow rate of the oxygen-containing educt, normally supplied air, is monitored. Thus, only temperature sensors and an air flow rate sensor as well as computer and control devices are required for controlling the flow quantity of fuel and water.

In an embodiment of the present invention, the momentary reaction quantity of the reactor is determined by measuring the temperature of the catalyst surface and/or the temperature of the product gases. Both methods open up a reasonable access to the reaction temperature while the precision is sufficient. The temperature of the catalyst surface is generally slightly higher than the temperature of the product gases. However, this can easily be taken into account when computing the temperature difference between the actual and the desired reaction temperature.

In a preferred embodiment of the gas generating system, the devices for feeding and controlling the mass flow rate of the liquid fuel comprise an injection valve and a pressure control valve. The mass flow rate is controlled by the opening time and/or the pressure of the injection valve and can be adjusted in a fast and precise manner. Injection systems are standard applications in automobile engine technology and can be reliably operated on the basis of long-term experiences.

In another preferred embodiment of the present invention, a heat exchanger is provided for preheating the educts. The hydrogen yield is influenced by the preheating temperature of the educts. By way of the heat exchanger, the heat of the product gases can advantageously be used for preheating the educts.

In another embodiment of the present invention, the heat exchanger is designed such that, for the autothermal reforming, the oxygen-containing educt and water in the heat exchanger are mixed, are jointly heated, and are supplied to the reactor as mixed gas. Only a single device is required for preheating the educts. In addition, as a result of the mixing and the joint heating of the educts, the determination of the educt temperatures can be reduced to the individual temperature measuring of the mixed gas.

It is understood that the above-mentioned advantages and those which will be explained in the following can be used not only in the respective indicated combination but also in other combinations or alone without leaving the scope of the present invention.

Other objects, advantages and novel features of the present invention will become apparent from the following detailed description of the present invention when considered in conjunction with the accompanying drawings.

BRIEF DESCRIPTION OF THE DRAWING

The sole FIGURE is a schematic block diagram of a gas generating system according to the present invention.

DETAILED DESCRIPTION OF THE DRAWING

A gas generating system 20 according to the present invention comprises a reactor 1 with a catalyst 2 in which, by partial oxidation or autothermal reforming, a hydrogen-rich product gas is generated from educts. The educts are preferably (1) fuel, such as gasoline, (2) oxygen in the form of atmospheric oxygen and (3) optionally water. The reactor 1 has an input 4, through which the educts are supplied to the catalyst 2, and an output 5 for discharging synthesis gas 19. The reactor 1 may, for example, be constructed as a tube reactor and is thermally insulated with respect to the environment by a jacket of suitable materials (not shown).

The educts are fed to the input 4 of the reactor 1 by supply pipes 6, 7, 8, 9. A mixing of the educts takes place partially in the reactor 1 and partially in a mixing stage 15. Hydrocarbon-containing fuel is introduced into the reactor 1 by way of a pipe 7 and additional air is introduced into the reactor 1 by way of a pipe 6, 9. During the so-called autothermal reforming, water is additionally supplied by way of a pipe 8; is mixed in a mixing stage 15 with the additional air, for example, by a fine atomizing; and is introduced into the reactor 1 by way of a joint pipe 9. The mixing stage 15 can simultaneously be used for preheating the educts. For this purpose, the mixing stage 15 is constructed as a heat exchanger in which the water/air mixture is preheated with the waste heat of the synthesis gas 19, preferably to from 400° C. to 700° C.

First and second temperature sensors 17, 18 are provided for measuring the educt temperature or momentary reaction temperature, respectively. The first temperature sensor 17 for measuring the temperature of the preheated air or of the air/water vapor mixture during autothermal reforming is arranged in the pipe 9 close to the input 4 of the reactor 1. The momentary reaction temperature is measured by the second temperature sensor 18 which is arranged at the output 5 of the reactor 1 and, for determining the reaction temperature, measures the temperature of the catalyst surface or the temperature of the synthesis gas. The determination of the temperature of the catalyst surface can also take place in a contactless manner by an optical sensor. Furthermore, for monitoring the air quantity, an air quantity sensor 14 can be arranged in the supply pipe 6 of the additional air. The required air quantity is made available by a compressor (not shown) as a function of the hydrogen quantity to be generated. In this case, the air quantity can also be monitored by analysis of the rotational compressor speed.

The temperature sensors 17, 18 and the air flow rate sensor 14 are connected with computer devices 16 which analyze the determined measured values and define control values for the control devices 10, 11, 12, 13. The computer devices 16 are also connected with the control devices 10, 11, 12 and 13 and comprise comparative values for computing the control values. In a simple embodiment of the control, the computer devices are implemented as PID controllers, the comparative values being defined in the form of the proportionality factor and of the control range of the respective PID controller.

The control devices 10, 11, 12, 13 for controlling the mass flow rates of fuel and water are provided in the supply lines 7 and 8. Specifically for controlling the flow quantity of the liquid fuel, a pump 10 and a pressure control valve 11 are arranged in the supply pipe 7. By way of a bypass pipe 7a, a portion of the fuel quantity can be returned to the input side of the pump 10. However, it is also possible to regulate the fuel quantity by controlling the pump 10 itself. On the reactor-side end of the supply pipe 7, an injection valve 12 is provided. By the injection valve 12, the fuel is uniformly distributed in the reactor space. Furthermore, a controlling of the fuel quantity can also be achieved by the injection valve 12. Devices known to a person skilled in the art, such as pumps, injection nozzles, or valves can be used as the control device 13 for controlling the water quantity.

According to the method of the present invention, the temperature of the heated additional air or of the heated air/water vapor mixture is measured by the first temperature sensor 17. The fuel temperature, which in view of the reaction temperature, is negligible with respect to the heated additional air or the heated air/water vapor mixture, will not be measured. The momentary reaction temperature is determined by the second temperature sensor 18.

From the measured educt temperature, an $O_2/C$ ratio is determined which theoretically results in a conversion of the preheated educts at the desired reaction temperature. By this adjustment, the desired optimal $O_2/C$ ratio is defined in a (first) rough approximation. This takes place by comparative values which assign to the respective educt temperatures a certain $O_2/C$ ratio in the form of a function, a characteristic curve, or a truth table. The $O_2/C$ ratio according to the educt temperatures is set by controlling the mass flow rate of the liquid fuel. From the deviation of the measured reaction temperature from the desired reaction temperature, a correction value is computed for the $O_2/C$ ratio and a corrected $O_2/C$ ratio is set by a corresponding change of the fuel flow rate. The $O_2/C$ ratio and thus the reaction temperature will be readjusted only when the temperature deviation is greater than a defined value. As a result of the corresponding selection of the defined value, the adjusting precision of the optimal $O_2/C$ ratio is defined.

During a dynamic operation of the gas generating system 20 according to the present invention (that is during the generating of variable quantities of hydrogen per time unit), the supplied air quantity is additionally monitored. The hydrogen quantity to be generated is in this case is determined or adjusted by the supplied air quantity. The air quantity itself is set by a (not shown) compressor. When the air flow rate is changed, the flow rate of the fuel is readjusted correspondingly. This takes place in a simple manner in that the $O_2/C$ ratio according to the educt temperatures ($O_2/C_{educt\ temperature}$) is additionally defined and set as a function of the determined air quantity. In other words, by comparative values, a certain $O_2/C$ ratio is assigned to the determined temperature of the air/water vapor mixture and the determined air quantity and is set by controlling the fuel flow rate. In the event of a sufficiently large deviation from the desired reaction temperature, this $O_2/C$ ratio, as described above, is corrected according to the measured reaction temperature by changing the fuel flow rate.

Like the comparative values, the desired reaction temperature is determined experimentally or from simulation computations with respect to an optimal $O_2/C$ ratio for a high hydrogen yield. The desired reaction temperature depends on the reaction conditions: the used catalyst, the dimension of the reactor, the provided performance data, the educt quantities, the used fuel, and the like. Instead of the desired reaction temperature, a function of the desired reaction temperature can be stored in the computer devices, for example, as functions of the time, the additional air quantity and/or the educt temperature. As a result, a special control behavior can be achieved at certain marginal conditions, for example, during the warm-up after a cold start. The desired reaction temperature may therefore be present as an individual value, as a function, or in form of truth tables.

In practice, the process according to the present invention was implemented by the following corner data: The partial oxidation or the autothermal reforming of the hydrogen-rich gas preferably takes place at a reaction temperature in a range of between 700° C. and 1,000° C. In this case, a temperature of approximately 850° C. was determined as the optimal reaction temperature. The additional air or the air/water vapor mixture is preferably preheated to approximately 500° C. A value of approximately 1.5 was set for the fuel/water ratio. In the case of the used adiabatic reactor, a 10% (relative) variation of the $O_2/C$ ratio results in a variation of the reaction temperature in the order of 100° C. The $O_2/C$ ratio is controlled with a precision in the 1% range, which corresponds to a variation of the reaction temperature by 10° C.

Although particular embodiments of the present invention have been illustrated and described, it will be apparent to those skilled in the art that various changes and modifications can be made without departing from the spirit of the present invention. It is therefore intended to encompass within the appended claims all such changes and modifications that fall within scope of the present invention.

What is claimed is:

1. A method of operating a gas generating system for generating a hydrogen-rich product gas from educts, a hydrocarbon-containing fuel, with the addition of oxygen, being converted by a catalytic partial oxidation or the hydrocarbon-containing fuel being converted with the addition of oxygen and water by autothermal reforming by catalytic water vapor reforming and catalytic partial oxidation in an at least approximately adiabatically operated reactor to hydrogen-rich product gas, said method comprising:

determining a temperature of educts before they are charged into the reactor;

determining a ratio of mole flow $O_{2\,oxygen}$ / mole flow C-atoms$_{fuel}$ of the educts for the educt temperatures at which theoretically a conversion of the educts takes place at a desired reaction temperature from the temperature of the educts by comparative values which assign to respective educt temperatures respective $O_2/C$ ratios by way of a function, a characteristic curve, or a truth table;

adjusting the $O_2/C$ ratio according to the educt temperatures by controlling a mass flow rate of the oxygen-containing educt for a known defined mass flow rate of the hydrocarbon-containing educt and optionally water or by controlling a mass flow rate of the hydrocarbon-containing educt for a known defined mass flow rate of the oxygen-containing educt and optionally water;

determining a momentary reaction temperature at an output of the reactor;

computing a correction value $\Delta O_2/C$ from a deviation of the momentary reaction temperature and the desired reaction temperature; and readjusting the $O_2/C$ ratio according to the computed correction value $\Delta O_2/C$ by controlling the mass flow rate of the oxygen-containing educt for a known defined mass flow rate of the hydrocarbon-containing educt and optionally water or by controlling the mass flow rate of the hydrocarbon-containing educt for a known defined mass flow rate of the oxygen-containing educt and optionally water so as to set a corrected $O_2/C$ ratio only when said deviation is greater than a defined value.

2. A method according to claim 1, wherein:

in the case of an adjusting of the $O_2/C$ ratio by controlling the mass flow rate of the oxygen-containing educt, the mass flow rate of the hydrocarbon-containing educt is monitored or, in the case of the adjusting of the $O_2/C$ ratio by controlling the mass flow rate of the hydrocarbon-containing educt, the mass flow rate of the oxygen-containing educt is monitored, and when the mass flow rate of the monitored educt is changed, the $O_2/C$ ratio is maintained by readjusting the mass flow rate of the controlled educt.

3. A method according to one of claim 1, wherein a ratio of water to the hydrocarbon-containing educt is maintained by readjusting a mass flow rate of the water when the flow rate of the hydrocarbon-containing educt is changed.

4. A method according to claim 1, wherein the controlling of the mass flow rates of the educts is by proportional integral differential controllers.

5. A method according to claim 4, wherein educt temperatures, reaction temperatures and optionally values of the mass flow rate of the monitored educt and the mass flow rate of the hydrocarbon-containing educt are input values for the proportional integral differential controllers.

6. A method according to claim 1, wherein only the temperature of those educts is determined whose temperature influence on the reaction temperature is not negligible with respect to the desired adjusting precision of the $O_2/C$ ratio.

7. A method according to claim 1, further comprising mixing a plurality of educts before charging into the reactor and determining the temperature of this educt mixture.

8. A method according to claim 1, wherein the hydrocarbon-containing educt is liquid fuel and the adjusting of the desired $O_2/C$ ratio takes place by controlling the mass flow rate of the liquid fuel.

9. A method according to claim 8, wherein the liquid fuel is selected from the group consisting of alcohols, liquefied petrol gas, natural gas, butane, propane, and conventional liquid fuels.

10. A method according to claim 9, wherein the alcohol is methanol.

11. A method according to claim 9, wherein the conventional liquid fuels are gasoline and diesel.

12. A method according to claim 1, wherein the momentary reaction temperature of the reactor is determined by measuring at least one of a temperature of a catalyst surface or a temperature of product gases.

13. A method according to claim 1, wherein the desired reaction temperature for an optimal $O_2/C$ ratio with respect to the hydrogen yield, comparative values for the $O_2/C$ ratio of the educt temperatures, and the comparative values for the correction value $\Delta O_2/C$ are determined from simulation computations or experimentally.

* * * * *